United States Patent [19]

Nakajima et al.

[11] 3,865,864

[45] Feb. 11, 1975

[54] PROCESS FOR PRODUCING CYANOALKADIENES

[75] Inventors: Hitoshi Nakajima, Ageo; Hiroji Nishimaru, Tokyo, both of Japan

[73] Assignee: Asaki Kasei Kogyo Kabushiki Kaisha, Osaka, Japan

[22] Filed: June 11, 1971

[21] Appl. No.: 152,450

[30] Foreign Application Priority Data
June 16, 1970 Japan.................. 45-51509

[52] U.S. Cl. .......................... 260/465.3
[51] Int. Cl. ........................... C07c 121/04
[58] Field of Search ................. 260/465.3

[56] References Cited
UNITED STATES PATENTS

| 3,347,900 | 10/1967 | Gossel et al. .............. 260/465.3 |
|---|---|---|
| 3,465,028 | 9/1969 | Kominami et al. ............ 260/465.3 |
| 3,470,230 | 9/1969 | Hirsch et al. ................ 260/465.3 |
| 3,479,392 | 11/1969 | Stern et al. ................. 260/465.3 |
| 3,524,874 | 8/1970 | Komanimi et al. ............. 260/465 C |
| 3,553,246 | 1/1971 | Kominami et al. ............ 260/465.3 |
| 3,574,701 | 4/1971 | Kominami et al. ............ 260/465.3 |
| 3,574,717 | 4/1971 | Lloyd ........................ 260/465.3 X |

Primary Examiner—Joseph P. Brust
Attorney, Agent, or Firm—Armstrong, Nikaido & Wegner

[57] ABSTRACT

A process is provided for producing cyanoalkadienes by causing a diolefinic hydrocarbon to react with hydrogen cyanide and oxygen in the presence of palladium catalyst. The products are useful intermediates in the preparation of synthetic rubber, ABS plastic and other commercially important plastics.

8 Claims, No Drawings

PROCESS FOR PRODUCING CYANOALKADIENES

BACKGROUND OF THE INVENTION

Recently cyanoalkadienes have become of interest as starting materials for synthetic rubbers and plastics in various industrial fields. However, processes for producing cyanoalkadienes in an economically advantageous manner have not yet been developed. The present inventors have found that cyanoalkadienes are produced easily and in good yield by causing a diolefinic hydrocarbon to react with hydrogen cyanide and oxygen in the presence of a catalyst such as palladium metal or palldium compound.

SUMMARY OF THE INVENTION

According to the present invention, a diolefinic hydrocarbon such as 1.3-butadiene, isoprene, 1.3-pentadiene, hexadiene or methylpentadiene is heated and caused to react with hydrogen cyanide under oxidation conditions in the presence of palladium metal or a palladium compound. As a result, a cyanoalkadiene corresponding to the starting diolefinic hydrocarbon is obtained. This reaction can be represented by the following equation:

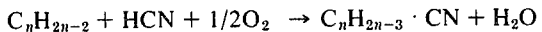

$$C_nH_{2n-2} + HCN + 1/2 O_2 \rightarrow C_nH_{2n-3} \cdot CN + H_2O$$

in which $n$ has a value of not less than 4, preferably 4 – 6.

DETAILED DESCRIPTION

The products obtained from the raw materials: butadiene, isoprene, pentadiene, hexadiene and methyl pentadiene are respectively cyanobutadiene, methyl cyanobutadiene, cyanohexadiene and methylcyanopentadiene. These cyanoalkadienes are sometimes obtained as isomeric mixtures. For example, cyanobutadiene is obtained as a mixture of cis-1-cyanobutadiene, trans-1-cyanobutadiene and 2-cyanobutadiene. One of the characteristics is that mostly the terminal carbon atom of the diolefinic hydrocarbon is substituted by a cyano radical. Therefore, most of cyanobutadienes obtained according to this invention are 1-cyanobutadienes in cis-form and trans-form.

Palladium metal or the palladium compound employed as the catalyst can be any palladium metal or compound which is commercially available, because such a metal or compound works in a condition that there is soaked a large amount of hydrogen cyanide on the surface of it during the reaction. Suitable palladium compounds include, for example, palladium oxide, palladium hydroxide, palladium sulfate, palladium nitrate, palladium cyanide, palladium halides such as palladium chloride, palladium bromide and palladium iodide, organic acid salts of palladium such as palladium acetate or palladium chloroacetate, and alkali metal salts of halogenopalladic acid such as potassium chloropalladate or cesium chloropalladate.

If required, the catalytic activity of palladium metals or palladium compounds can be increased by adding other metallic compounds. Such metallic compounds include chloride, bromide, iodide, oxide, hydroxide, organic acid salt, sulfate, sulfite, sulfide, nitrate, nitrite, rhodanate, phosphate, cyanide, chlorate, bromate, iodate and perchlorate etc. of the following each metals; alkali metals, copper, alkali earth metals, zinc, cadmium, rare earth metals such as lanthanum and cerium, indium, thallium, actinide metals such as thorium and uranium, tin, lead, vanadium, niobium, tantalum, arsenic, antimony, bismuth, chromium, molybdenum, tungsten, manganese, rhenium, elements of iron family, ruthenium, and platinum, etc.

It is desirable to use a catalyst which is supported on a carrier, although a carrier is not always required. As the carrier, porous materials such as silica or alumina are suitable.

It is advantageous to carry out the process of this invention in the vapour phase. Prefered temperature during the reaction is between 100° – 600°C, especially between 220° – 380°C. If a hydrogen halide other than hydrogen fluoride such as hydrogen chloride, hydrogen bromide or hydrogen iodide is added during the reaction, the space time yield of cyanoalkadiene generally increases and the decrease of the yield with the passage of time is generally prevented. However, this addition of hydrogen halide can be omitted.

This reaction may be carried out in the presence of an inert gas or less reactive gas. Such gases include, for example, nitrogen, carbon dioxide, water vapour, carbon monoxide and small quantities of sulfur dioxide. However, these gases are not essential to the process.

Because it is necessary to carry out the reaction under oxidation conditiions, oxygen gas or an oxygen-containing gas is used as a reactant. The composition of the mixed gas must be in such a range as not to cause an explosion. Preferably 0.02 – 1.5 moles of hydrogen cyanide, based on the unit mol of alkadiene, is used and oxygen is present in an amount of 0.5 – 5 times that of the hydrogen cyanide present by the mol ratio. If hydrogen halide is added, it should be used in an amount of 0.1 – 5 times that of hydrogen cyanide by the mol ratio.

The space time yield of the product cyanoalkadienes generally increases along with increasing pressures ranging from atmospheric pressure up to 10 atmospheres.

This process of the invention may be carried out using any reaction method such as fixed bed, moving bed and fluidized bed.

Palladium metal or the palladium compound catalyst, the activity of which decreases during the reaction, can be regenerated by heating in the presence of an oxygen-containing gas such as air or oxygen. It is possible to shorten time required for the regeneration of the palladium metal or palladium compound catalyst by the above mentioned method by the addition of a halogen or hydrogen halide.

The present invention is illustrated by the following examples.

EXAMPLE 1.

A U-tube made of hard glass was charged with 50g of silica gel containing 1 percent by weight of palladium and 6.7 percent by weight of cesium chloride. The tube was dipped into a fused salt bath kept at 300°C. Then, a mixed gas of butadiene hydrogen cyanide, oxygen, hydrogen chloride, and nitrogen (mol ratio - 20:5:10:5:60) was introduced into the bath at a rate of 30l/h. Cyanobutadiene was obtained in a yield of 71 percent based upon the hydrogen cyanide. The cyanobutadiene thus obtained is composed of 57 percent of cis-1-cyanobutadiene, 38 percent of trans-1-cyanobutadiene and 5 percent of 2-cyanobutadiene.

EXAMPLE 2.

The procedure of Example 1 was repeated but the U-tube was charged with 100g of activated alumina containing 2 percent by weight of palladium chloride and 3 percent by weight of sodium chloride. Then, at a temperature of 315°C, a mixed gas of butadiene, hydrogen cyanide, oxygen, hydrogen chloride and nitrogen (mol ratio - 20:3:8:3:66) was introduced at a rate of 60l/h. As a result, cyanobutadiene was obtained in a yield of 65 percent based upon the hydrogen cyanide.

EXAMPLE 3.

80g of silica gel which contained 0.2 percent by weight of palladium and 5 percent by weight of potassium bromide was maintained at the temperature of 270°C, then a mixed gas of pentadiene, hydrogen cyanide, oxygen, hydrogen bromide and nitrogen (mol ratio - 5:5:10:5:75) was introduced at a rate of 15 l/h. Thus, cyanopentadiene was obtained in a yield of 27 percent based upon the hydrogen cyanide.

EXAMPLE 4.

100g of silica gel which contained 0.5 percent by weight of palladium cyanide and 1.8 percent by weight of lithium chloride was maintained at 300°C, then nitrogen gas containing isoprene, hydrogen cyanide, oxygen and hydrogen chloride (5 mol percent each) was introduced at a rate of 15 l/h. As a result, cyanomethyl butadiene was obtained in a yield of 11 percent and cyanobutadiene in a yield of 8 percent based upon the hydrogen cyanide.

EXAMPLE 5.

100g of activated alumina which contained 3 percent by weight of pottasium chloropalladate and 1 percent by weight of cadmium chloride was maintained at 320°C. Then nitrogen gas containing 5 mol percent of butadiene, 3 mol percent of hydrogen cyanide, 5 mol percent of oxygen, 5 mol percent of hydrogen chloride and 0.5 mol percent of hydrogen iodide was introduced at a rate of 60 l/h. Thus, cyanobutadiene was obtained in a yield of 52 percent based upon the hydrogen cyanide.

EXAMPLES 6 – 9.

Using silica gel which contained 1 percent by weight of palladium and a prescribed amount of rubidium chloride, calcium chloride, barium chloride or zinc chloride, butadiene was caused to react with hydrogen cyanide in a series of experiments. The results were as follows.

Table 1.

| added compounds | | rubidium acetate | calcium chloride | barium chloride | zinc chloride |
|---|---|---|---|---|---|
| amount of added compounds (weight %) | | 6 | 2.5 | 4 | 2.6 |
| amount of catalyst (g) | | 50 | 100 | 100 | 100 |
| amount of mixed gas (l/h) | | 60 | 60 | 60 | 45 |
| composition of mixed gas (mol %) *nitrogen is not included here. | butadiene | 15 | 15 | 15 | 5 |
| | hydrogen cyanide | 2 | 5 | 3 | 5 |
| | oxygen | 5 | 5 | 7 | 5 |
| | hydrogen chloride | 3 | 5 | 1 | 3 |
| temperature (°C) | | 300 | 300 | 290 | 310 |
| yield of cyanobutadiene based upon the hydrogen cyanide (%) | | 80 | 31 | 35 | 28 |

EXAMPLE 10.

50g of silica gel which contained 2 percent by weight of palladium and 12 percent by weight of pottassium iodide was maintained at 300°C and a mixed gas of butadiene, hydrogen cyanide, oxygen and nitrogen (mol ratio - 10:1:5:84) was introduced at a rate of 15 l/h. Cyanobutadiene was obtained in a yield of 80 percent based upon the hydrogen cyanide.

EXAMPLE 11.

100g of silica gel which contained 2 percent by weight of palladium was maintained at 320°C and a mixed gas identical with that of Example 10 was introduced at a rate of 15 l/h. Cyanobutadiene was obtained in a yield of 7 percent based upon the hydrogen cyanide.

EXAMPLE 12.

100g of silica gel containing 3 percent by weight of palladium chloride was maintained at 320°C and a mixed gas identical with that of Example 10 was introduced at a rate of 15 l/h. Cyanobutadiene was obtained in a yield of 8 percent based upon the hydrogen cyanide.

We claim:

1. A process for the selective introduction of a single cyano group at a terminal unsaturated carbon atom of a diolefin selected from the group consisting of 1,3-butadiene, isoprene and 1,3-pentadiene, whereby there is produced a 1-monocyanoalkadiene which comprises treating said diolefin in the vapor phase at a temperature of from 100° to 600°C with 0.02 to 1.5 mols hydrogen cyanide per mol of said diolefin and 0.5 to 5.0 mols oxygen per mol hydrogen cyanide in the presence of a palladium catalyst selected from the group consisting of palladium metal, palladium oxide, palladium hydroxide, palladium sulfate, palladium nitrate, palladium cyanide, palladium chloride palladium bromide, palladium iodide, palladium acetate, palladium chloroacetate, potassium chloropalladate and cesium chloropalladate.

2. A process according to claim 1, in which said palladium catalyst is supported on an inert carrier.

3. A process according to claim 1, in which a halide selected from the group consisting of alkali metals, alkali earth metals, cadmium and zinc is added to said palladium catalyst.

4. A process according to claim 1, in which the reaction temperature is between 220° and 380°C.

5. A process according to claim 1, in which oxygen and hydrogen cyanide are introduced in admixture with an inert gas.

6. A process according to claim 1, in which the reaction is carried out at a pressure ranging between atmospheric pressure and 10 atmospheres.

7. A process of claim 1, wherein the reaction is carried out in the presence of 0.1 to 5.0 mol hydrogen chloride or hydrogen bromide per mol hydrogen cyanide.

8. A process of claim 1, wherein said diolefin is 1,3-butadiene.

* * * * *